(12) United States Patent
Greiff et al.

(10) Patent No.: US 12,228,180 B2
(45) Date of Patent: Feb. 18, 2025

(54) PULSATION DAMPER

(71) Applicant: Continental Teves AG & Co. OHG, Frankfurt am Main (DE)

(72) Inventors: Uwe Greiff, Seligenstadt (DE); Volker Grings, Laudert (DE); Axel Hinz, Neu-Anspach (DE); Christoph Wagner, Bad Nauheim (DE); Stefan Schmitt, Aschaffenburg (DE); Petra Fischbach-Borazio, Frankfurt (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/769,426

(22) PCT Filed: Oct. 12, 2020

(86) PCT No.: PCT/EP2020/078609
§ 371 (c)(1),
(2) Date: Apr. 15, 2022

(87) PCT Pub. No.: WO2021/074076
PCT Pub. Date: Apr. 22, 2021

(65) Prior Publication Data
US 2024/0125362 A1    Apr. 18, 2024

(30) Foreign Application Priority Data
Oct. 17, 2019  (DE) ............ 10 2019 215 988.5

(51) Int. Cl.
*B60T 8/40* (2006.01)
*B60T 8/173* (2006.01)
(Continued)

(52) U.S. Cl.
CPC .......... *F16D 65/0012* (2013.01); *B60T 8/173* (2013.01); *B60T 8/4068* (2013.01);
(Continued)

(58) Field of Classification Search
CPC ........ B60T 8/4068; F15B 1/021; F16L 55/04; F16L 55/05
See application file for complete search history.

(56) References Cited

U.S. PATENT DOCUMENTS 2,957,702 A * 10/1960 Heiss .................. B60G 15/12
                                                280/124.159
5,209,553 A    5/1993 Burgdorf et al.
(Continued)

FOREIGN PATENT DOCUMENTS

CN    202180817       4/2012
CN    103080552 A     5/2013
(Continued)

OTHER PUBLICATIONS

Search Report dated Jun. 3, 2020 from corresponding German patent application No. 10 2019 215 988.5.
(Continued)

*Primary Examiner* — Thomas J Williams

(57) ABSTRACT

A pulsation damper for damping pressure medium vibrations in a hydraulic system, has a membrane within a bore of a housing, which membrane is exposed to the pressure medium on its one side and faces a gas-filled cavity inside the housing on its other side, the bore of which is closed by means of a plug. The membrane, in conjunction with the plug and a hollow-cylindrical support body, forms an independently handleable, functionally pre-testable assembly, for which purpose the membrane is substantially cup-shaped, and the support body extends into it.

12 Claims, 5 Drawing Sheets

(51) Int. Cl.
*B60T 11/28* (2006.01)
*B60T 13/66* (2006.01)
*F16D 65/00* (2006.01)
*F16L 55/04* (2006.01)
*F15B 1/02* (2006.01)
*F16L 55/05* (2006.01)

(52) U.S. Cl.
CPC ............ *B60T 11/28* (2013.01); *B60T 13/662* (2013.01); *F16L 55/04* (2013.01); *B06B 2201/40* (2013.01); *B60Y 2304/01* (2013.01); *B60Y 2304/072* (2013.01); *F15B 1/021* (2013.01); *F16L 55/05* (2013.01)

(56) References Cited

U.S. PATENT DOCUMENTS

| | | | |
|---|---|---|---|
| 6,164,336 A * | 12/2000 | Pasquet | B60T 8/409 138/30 |
| 6,669,309 B1 | 12/2003 | Gierer et al. | |
| 9,637,100 B2 | 5/2017 | Reiner et al. | |
| 9,758,142 B2 * | 9/2017 | Doh | B60T 13/148 |
| 2010/0319334 A1 | 12/2010 | Kley et al. | |
| 2012/0133201 A1 * | 5/2012 | Zeoli | B60T 8/4068 303/11 |
| 2014/0000740 A1 * | 1/2014 | Wald | F16L 55/053 138/30 |
| 2015/0360658 A1 | 12/2015 | Reiner et al. | |
| 2016/0176387 A1 | 6/2016 | Speer | |
| 2017/0057478 A1 * | 3/2017 | Her | B60T 8/4068 |
| 2017/0253222 A1 | 9/2017 | Weitze | |
| 2024/0125362 A1 * | 4/2024 | Greiff | B60T 8/173 |

FOREIGN PATENT DOCUMENTS

| | | | | |
|---|---|---|---|---|
| CN | 106458178 A | 2/2017 | | |
| DE | 3133111 A1 | 4/1983 | | |
| DE | 3912935 A1 | 12/1990 | | |
| DE | 19910100 A1 * | 9/2000 | ............ | B60T 17/00 |
| DE | 102005028562 A1 | 10/2006 | | |
| DE | 102009006980 A1 | 8/2009 | | |
| DE | 102013225785 A1 | 6/2015 | | |
| DE | 102014226005 A1 | 6/2016 | | |
| DE | 102016201595 A1 | 8/2017 | | |
| DE | 102017213322 A1 | 2/2019 | | |
| EP | 0907533 A1 | 4/1999 | | |
| EP | 0907533 B1 | 3/2002 | | |
| JP | 2016003007 A | 1/2016 | | |
| JP | 2019051925 A | 4/2019 | | |
| WO | 0181812 A1 | 11/2001 | | |
| WO | 2012024823 A1 | 3/2012 | | |
| WO | 2015188967 A1 | 12/2015 | | |
| WO | 2016096188 A1 | 6/2016 | | |

OTHER PUBLICATIONS

International Search Report and Written Opinion dated Nov. 20, 2020 from corresponding International patent application No. PCT/EP2020/078609.

Korean Notice of Preliminary Rejection issued on Mar. 28, 2023 for the counterpart Korean Patent Application No. 10-2022-7010304.

Chinese Office Action dated May 9, 2024 for the counterpart Chinese Patent Application No. 202080071121.9 and machine translation of same.

* cited by examiner

PULSATION DAMPER

CROSS REFERENCE TO RELATED APPLICATIONS

This U.S. patent application claims the benefit of PCT patent application No. PCT/EP2020/078609, filed Oct. 12, 2020, which claims the benefit of German patent application No. 10 2019 215 988.5, filed Oct. 17, 2019, both of which are hereby incorporated by reference.

TECHNICAL FIELD

The invention relates to a pulsation damper for damping pressure medium vibrations in a hydraulic system, in particular in a slip-controlled motor vehicle brake system.

BACKGROUND

A pulsation damper for damping pressure medium vibrations in a hydraulic brake system is already known from EP0907533B1, for which purpose the pulsation damper has a membrane within a bore of a housing, which membrane is exposed to the pressure medium on its one side while the other side of the membrane faces a gas-filled cavity inside the housing, the bore of which is closed by means of a plug.

However, the membrane has to be fixed between the plug and the bore in the housing, and therefore no preliminary testing of the pulsation damper in respect of the functionality can be carried out. Further, this construction results in limited effectiveness of the damping of pressure vibrations and durability of the membrane.

SUMMARY

It is therefore desirable to create a pulsation damper that can be easily checked in respect of its function and that is characterized by a compact, functionally reliable design with a high degree of damping.

A pulsation damper has a membrane, a plug and a hollow-cylindrical support body, which form an independently handleable, functionally pre-testable assembly. The membrane is substantially cup-shaped, and the support body protrudes into it.

BRIEF DESCRIPTION OF THE FIGURES

Exemplary embodiments are illustrated in longitudinal section with reference to a plurality of drawings and will be described in more detail below.

In the drawings.

DETAILED DESCRIPTION

Figure 1:
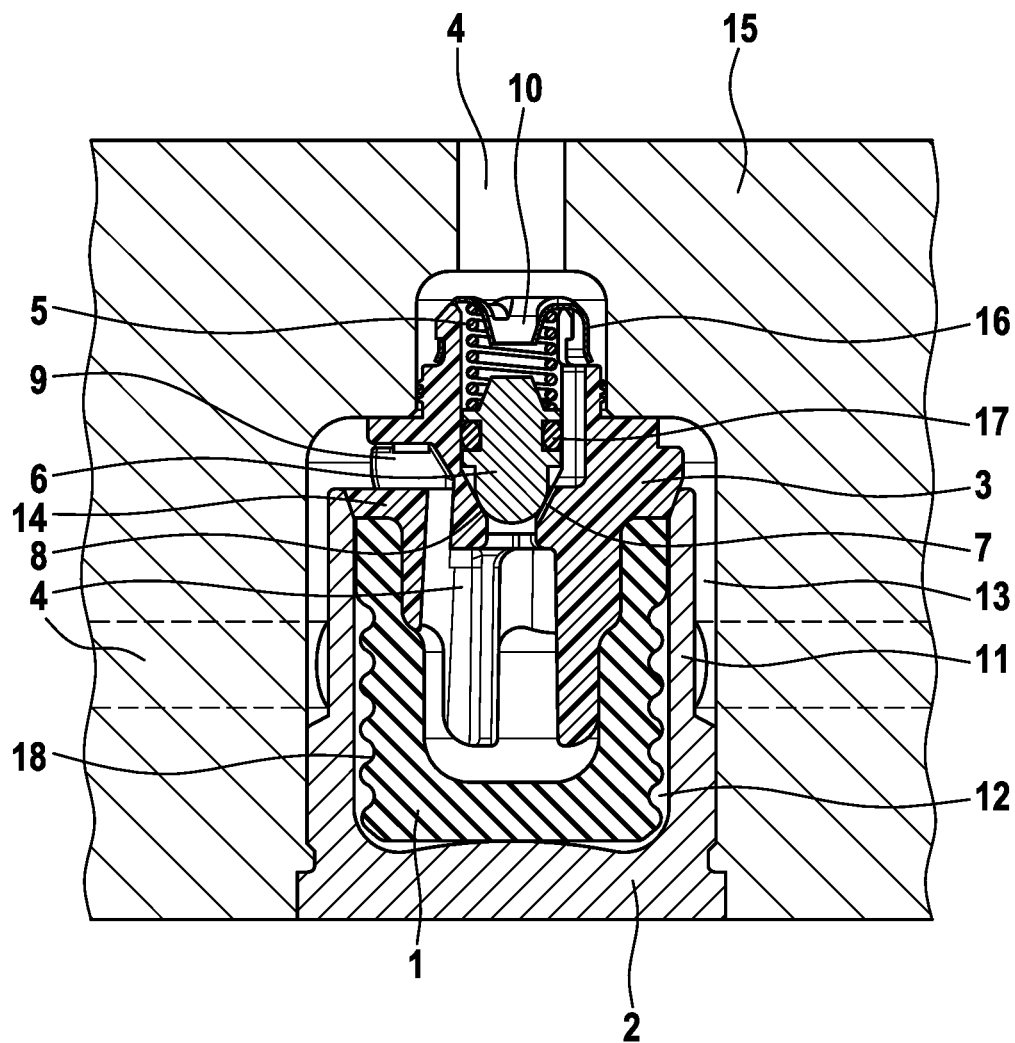
FIG. 1 shows a schematic sectional illustration of a pulsation damper with a membrane which has a plurality of transverse grooves on the outer circumference.

FIGS. 1 to 5 show several embodiments of diverse pulsation dampers in longitudinal section, which pulsation dampers are used to damp pressure medium vibrations in a hydraulic system, in particular in a slip-controlled motor vehicle brake system.

The pulsation damper inserted in each case within a bore 13 of a block-shaped housing 15 has a membrane 1, which is exposed on its inner side to the pressure medium, which is usually delivered in a pulsating manner by a pressure generator, while the outer circumference of the membrane 1 is exposed in sections to a gas-filled cavity 12.

The bore 13 provided for receiving the pulsation damper is closed in all embodiments by means of a plug 2, wherein the membrane 1, in conjunction with the plug 2 and a hollow-cylindrical support body 3, forms a compact, independently handleable, functionally pre-testable assembly, for which purpose the membrane 1 is substantially cup-shaped, and the support body 3 extends into it.

The membrane 1 is produced from a permanently elastic material, in particular rubber or metal, while the plug 2 is produced by cold extrusion or machining of a free-cutting steel. Furthermore, the membrane 1 is provided either with a plurality of grooves 18 or longitudinally running ribs 19 along the outer circumference.

Figure 2:
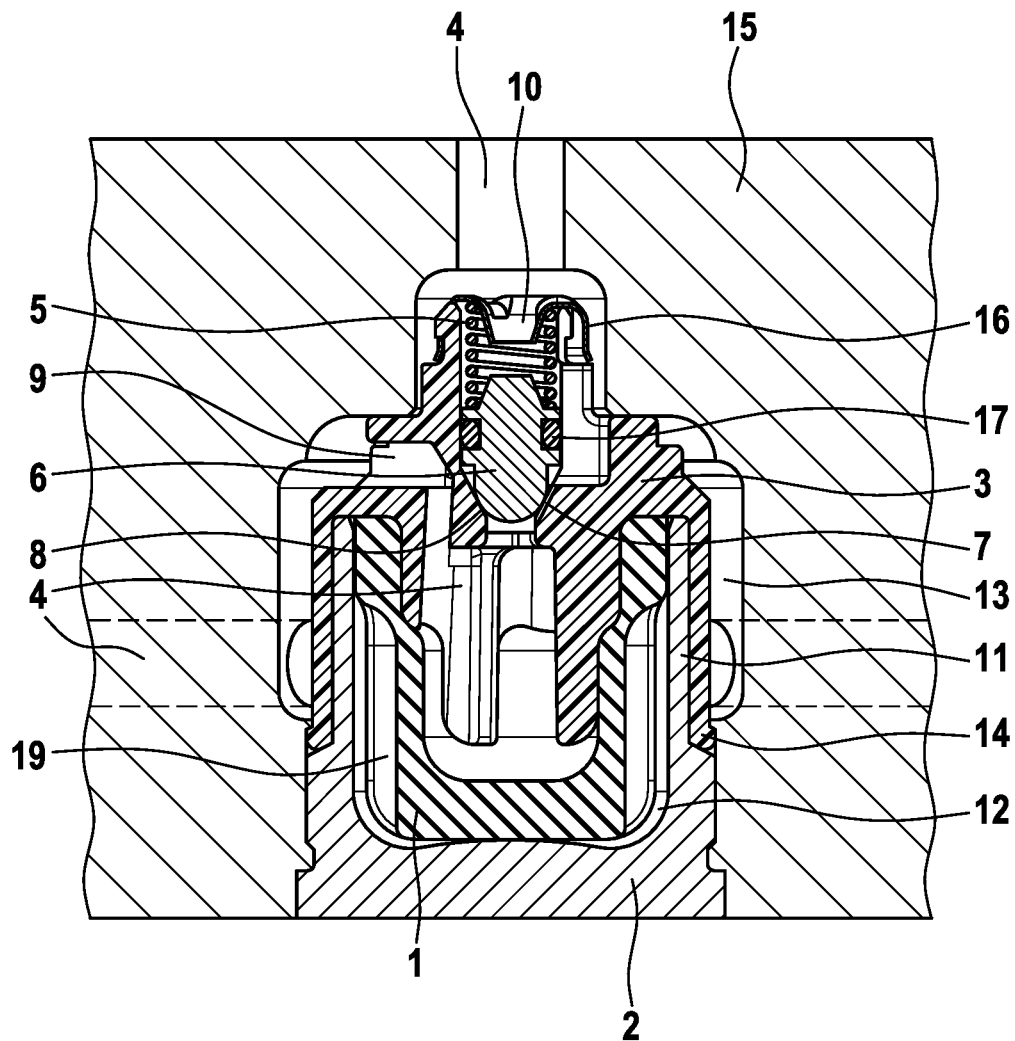
FIG. 2 shows a sectional illustration of a another embodiment of the pulsation damper, the membrane of which is provided with longitudinal grooves on the outer circumference.
Figure 3:
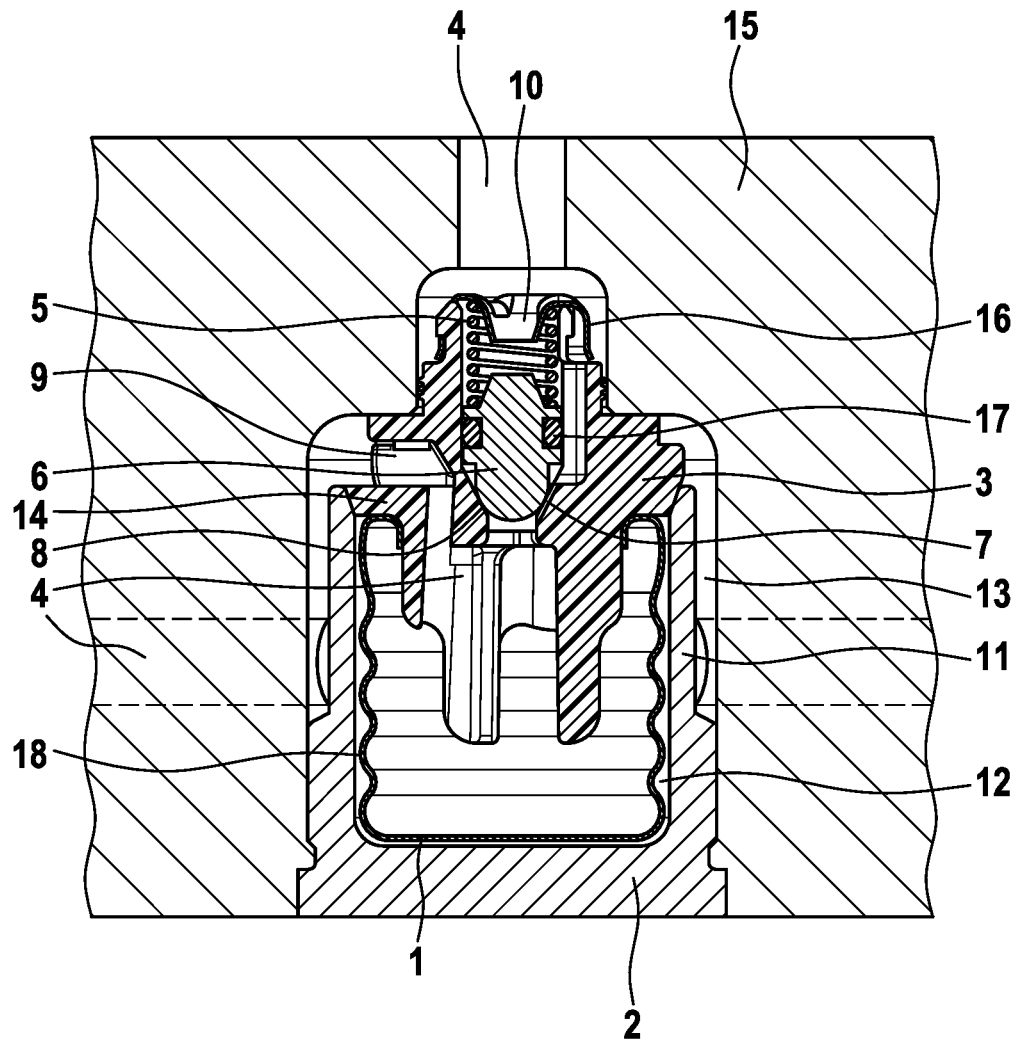
FIG. 3 shows a sectional illustration of a another embodiment of the pulsation damper, which has a metal membrane.

In order to be able to provide effective vibration damping, in each of FIGS. 1 to 3 the support body 3 is penetrated by a channel 4, into which a nonreturn valve 6, which is acted upon by a compression spring 5 and opens on the outlet side, is inserted. Furthermore, it can be seen from FIGS. 1 to 3 that, parallel to the nonreturn valve 6, a fixed orifice 7 is arranged in the channel 4, the fixed orifice for example being configured as a notch in the region of a valve seat 8 provided for the nonreturn valve 6 in the channel 4.

In the embodiments according to FIGS. 1 to 3, the channel 4 has a radial inlet region 9 and an axial outlet region 10 in the support body 3, wherein the fixed orifice 7 and the nonreturn valve 6 opening in the direction of the outlet region 10 are arranged in the outlet region 10 of the channel 4 for effective vibration damping.

According to FIGS. 1 to 3, the plug 2 has a sleeve-shaped section 11 in which the cup-shaped membrane 1 is completely accommodated such that the gas-filled cavity 12 is formed between the outer surface of the membrane 1 and the inner surface of the sleeve-shaped plug 2. Since the end of the membrane 1 facing away from the plug 2 is securely fixed to the sleeve-shaped section 11 with the aid of the support body 3, the gas-filled cavity 12 is hermetically separated from the pressure medium within the bore 13.

In all of the figures, the support body 3 has a collar 14 which is non-positively connected to the sleeve-shaped section 11 in order to securely fix and seal the gas-filled cavity 12.

Figure 4:
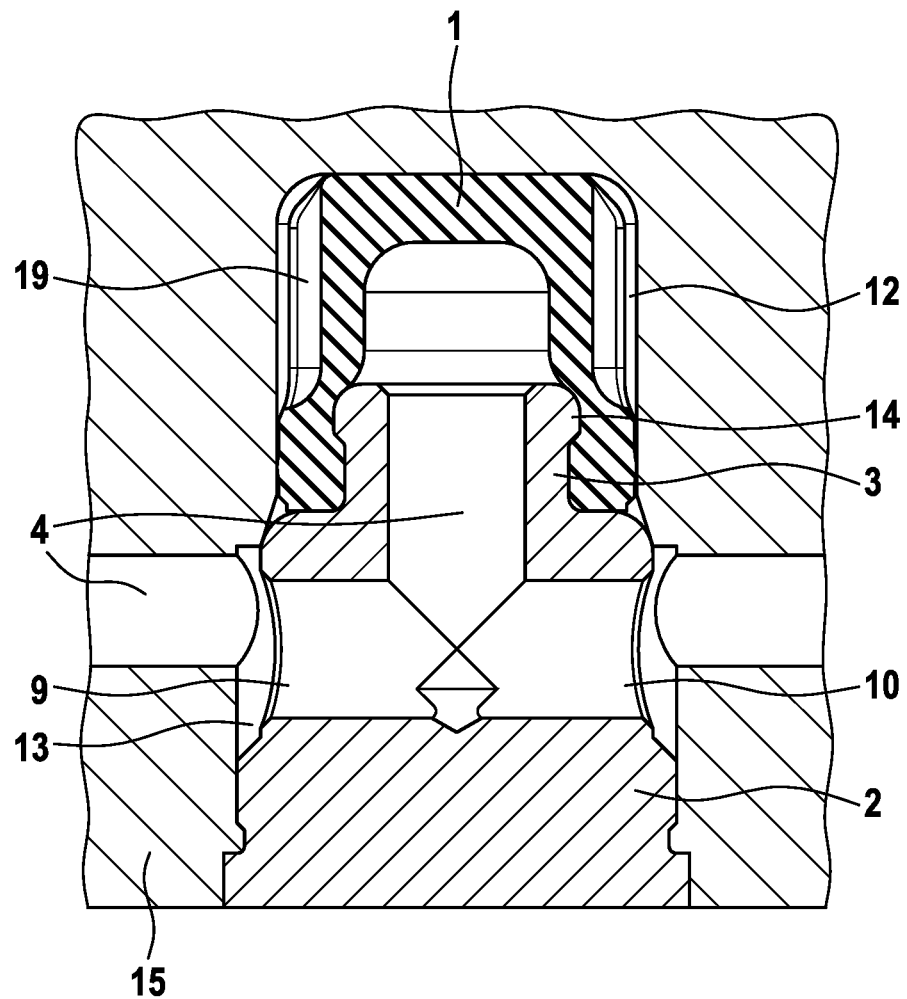
FIG. 4 shows a sectional illustration of a pulsation damper, the membrane of which is fixed to a support body which is integrally connected to a plug closing the housing.

In contrast to the embodiments according to FIGS. 1 to 3, in FIG. 4 the nonreturn valve 6, in conjunction with the fixed orifice 7, is not integrated in the support body 3, since the support body 3 is formed integrally directly on the plug 2 Therefore, as a result of the compact design, the membrane 1 is directly fixed to the collar 14 of the support body 3 and is thus inserted as a pre-assembly component with the plug 2 directly into the bore 13 of the block-shaped housing 15.

The volume-accommodating and therefore pulsation-damping element is thus formed by an elastic membrane 1 which separates a gas filling in the cavity 12 from the operating medium (for example, brake fluid) within the bore 13.

According to FIGS. 1 to 3, the membrane 1 protrudes completely into the sleeve-shaped section 11 of the plug 2, which section is fixed in the block-shaped housing 15 for example by means of what is referred to as a clinch connection. Optionally, according to FIG. 4, instead of using the sleeve-shaped section 11, the desired contour for accommodating the membrane 1 can also be introduced directly into the bore 13 of the housing 15. This creates a damping chamber. In principle, the volume/pressure characteristic of the pulsation damper can be influenced by the contour of the damping chamber, the sleeve-shaped section 11, the housing 15 and/or the membrane 1 in order to reduce the pressure pulsations.

In all the exemplary embodiments according to FIGS. 1 to 4, the support body 3 extends into the membrane 1, the support body 3 according to FIGS. 1 to 3 delivering the radial sealing pressure of the membrane 1 against the inner wall of the sleeve-shaped section 11 while, in a departure therefrom according to FIG. 4, the membrane 1 is pressed directly against the wall of the bore 13 by the support body 3.

The spring-loaded nonreturn valve 6 is integrated in the support body 3 and releases a large cross section for the outflow from a defined pressure of the pressure medium to be damped. Until the defined pressure is reached, the pressure medium flows through the fixed orifice 7, which is structurally molded into the valve seat 8 of the support body 3 (or into the plunger-shaped nonreturn valve 6), past the closed nonreturn valve 6. Pressure pulses that are not high enough to open the nonreturn valve 6 are absorbed by the elasticity of the membrane 1 and released again when the pressure drops. The pressure surges caused by the pressure generator/pump are thereby divided and partially diverted into the damping chamber. The volume flow to the consumer becomes more uniform and the components are excited less into vibrating. In conjunction with the channel 4, the support body 3 directs and divides the volume flow here in such a way that it cannot flow out without passing through the fixed orifice 7.

The membrane 1 is sealed in relation to the bore 13 and to the support body 3 in the radial direction. If desired or required, the support body 3 is provided with a for example deep-drawn collar 14 (see FIG. 2) and seals the sleeve-shaped section 11 on the outer circumference against the pressure medium (operating medium) such that the pressure medium does not come into contact with the sleeve material and thus a possible chemical reaction of the pressure medium (e.g. brake fluid) on contact with zinc-containing surfaces is avoided.

The integration of the fixed orifice 7 and the nonreturn valve 6 in the support body 3 reduces the outlay for arranging the channel bore in the housing 15 and the closure covers or balls required for this purpose.

The peg-shaped design of the support body 3 enables an optimal incident flow onto the membrane 1 and a flow deflection and an optimal outflow of the pressure medium. The support body 3 ensures that the gas volume is securely sealed against the operating medium and that the membrane 1 is securely installed, and prevents the membrane 1 from being inverted when the system is filled with a vacuum.

Since all of the relevant functional surfaces are primarily located within the sleeve-shaped section 11 or within the housing 15, damage to these surfaces is largely ruled out. This results in an increase in the quality of the surface (bulk material) during production, surface treatment and installation, because the inner surfaces are more difficult to damage. The support body 3 makes it possible to simply integrate the fixed orifice 7 and the nonreturn valve 6 and to check the preassembled assembly outside the housing 15 for satisfactory functioning.

Figure 5:
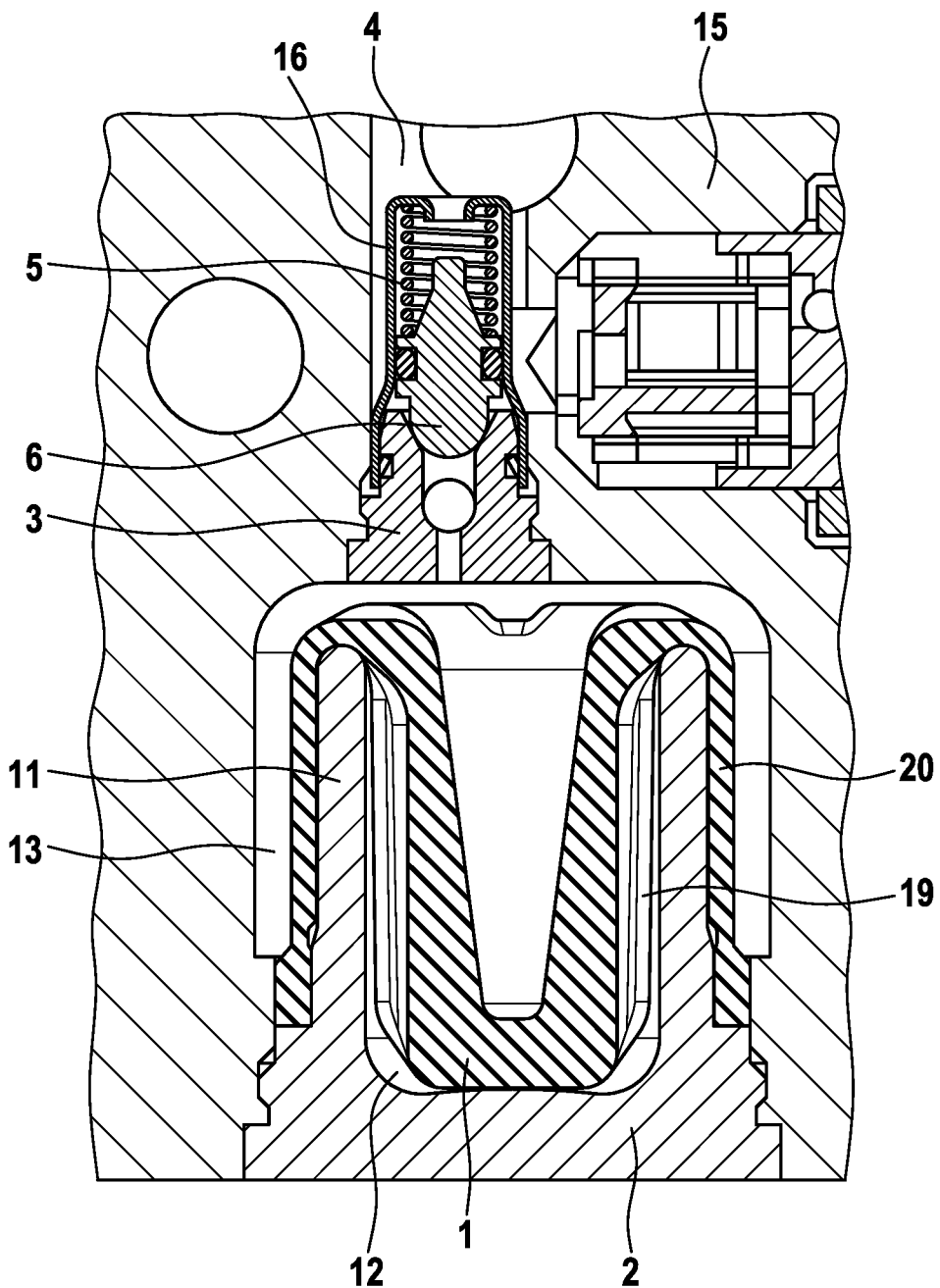
FIG. 5 shows a sectional illustration of a pulsation damper, the membrane of which encloses the plug in the region of its tubular section.

Finally, FIG. 5 shows a further expedient embodiment of a pulsation damper, the membrane 1 of which has a sleeve-shaped extension 20 which completely encloses a tubular section 11 of the plug 2 along its outer circumference, wherein the end of the extension 20 between the section 11 and the housing 15 is fixed under radial prestress. As a result, the plug 2 is completely covered by the membrane 1 within the bore 13 such that chemical reactions of the plug material are prevented as a result of the separation from the brake fluid. Furthermore, between the section 11 and the cup-shaped region of the membrane 1, a plurality of ribs 19 which run in the longitudinal direction are provided on the circumference of the membrane 1, and therefore the design of said ribs can be used to adjust the rigidity of the membrane 1.

The remaining details of the nonreturn valve 6 shown in FIG. 5 substantially correspond to those described in FIGS. 1 to 3, but with the special feature that the support body 3 with the nonreturn valve 6 is arranged separately in the housing 15.

The invention claimed is:

1. A pulsation damper for damping pressure medium vibrations in a slip-controlled motor vehicle brake system comprising:
   a membrane within a bore of a housing, wherein membrane is exposed to the pressure medium on one side and faces a gas-filled cavity inside the housing on an opposing side, wherein the membrane is cup-shaped and has at least one of grooves and ribs defined on the circumference thereof; and
   a cup-shaped plug to close the bore of the housing, wherein the membrane and the plug form an independently handleable, functionally pre-testable assembly, wherein the membrane has a sleeve-shaped extension which completely encloses a tubular section of the plug along its outer circumference; and
   a plurality of ribs run in the longitudinal direction on the circumference of the membrane between the tubular section and the cup-shaped region of the membrane.

2. The pulsation damper as claimed in claim 1, further comprising:
   a hollow-cylindrical support body which defines a channel;
   a nonreturn valve inserted into the channel, wherein the nonreturn valve opens on an outlet region of the channel; and
   a compression spring inserted in the channel which acts upon the nonreturn valve.

3. The pulsation damper as claimed in claim 2, wherein a fixed orifice is arranged in the channel parallel to the nonreturn valve.

4. The pulsation damper as claimed in claim 3, wherein the fixed orifice is a notch in the region of a valve seat provided for the nonreturn valve in the channel.

5. The pulsation damper as claimed in claim 3, wherein the channel has a radial inlet region and the outlet region in the support body is axial.

6. The pulsation damper as claimed in claim 5, wherein the fixed orifice and the nonreturn valve opening in the direction of the outlet region are arranged in the outlet region of the channel.

7. The pulsation damper as claimed in claim 1, wherein the gas-filled cavity is formed between the membrane and the plug and is separated by the support body from the bore carrying the pressure medium.

8. The pulsation damper as claimed in claim 1, wherein the membrane is produced from a permanently elastic material.

9. The pulsation damper as claimed in claim 8, wherein the permanently elastic material is one of rubber and metal.

10. The pulsation damper as claimed in claim 1, wherein the plug is produced by one of cold extrusion and machining of a free-cutting steel.

11. The pulsation damper as claimed in claim 1, wherein the end of the extension between the tubular section and the housing is fixed under radial prestress.

12. The pulsation damper as claimed in claim 1, wherein the plug has a press fit with the housing.

* * * * *